United States Patent

[11] 3,556,471

| [72] | Inventor | Herman L. Paul, Jr. |
| | | 450 Westover Road, Stamford, Conn. 06902 |
| [21] | Appl. No. | 826,094 |
| [22] | Filed | May 20, 1969 |
| [45] | Patented | Jan. 19, 1971 |

[54] BALL VALVE
8 Claims, 2 Drawing Figs.

[52] U.S. Cl. .................................................. 251/172, 251/315
[51] Int. Cl. .................................................. F16k 5/20
[50] Field of Search .................................................. 251/172, 315, 309, 316, 317, 173, 170, 171

[56] References Cited
UNITED STATES PATENTS

| 2,839,266 | 6/1958 | Kaiser ........................... | 251/315X |
| 2,912,219 | 11/1959 | Clade ............................ | 251/315 |
| 2,930,576 | 3/1960 | Sanctuary ...................... | 251/315X |
| 3,146,988 | 9/1964 | Riopelle ........................ | 251/315 |
| 3,167,300 | 1/1965 | Kaiser ........................... | 251/172X |
| 3,371,907 | 3/1968 | Scaramucci ................... | 251/315X |
| 3,462,120 | 8/1969 | Priese ............................ | 251/315 |

*Primary Examiner*—Clarence R. Gordon
*Attorney*—F. J. Pisarra

ABSTRACT: A generally spherical plug of a bidirectional ball valve is supported in the valve housing by similar, oppositely arranged support rings retained in the housing and engaging the plug's surface toward but spaced from opposite ends thereof. Oppositely arranged, flexible sealing rings, separate from the support rings, engage the plug's surface in a circular line contact adjacent to the ends of the plug. The support rings are vented to constitute the housing space between the sealing rings as a single fluid chamber giving fluid support to the plug.

INVENTOR.
HERMAN L. PAUL, JR.
BY
F. J. Pisarra
ATTORNEY 3,556,471

BALL VALVE

BACKGROUND OF THE INVENTION of the Invention

Prior ball valves have suffered various drawbacks as, for example; high friction between the valve's spherical plug and its support means, making operation difficult, subjection to objectionable shock upon closing of the valve, and excessive friction at the means for sealing the plug, this, also, making operation difficult.

An important object of this invention is to substantially reduce friction at the sealing means to facilitate operation of the valve.

Another important object is to provide sealing means which are responsive to fluid pressure at the upstream side of the valve, when the latter is closed, to enhance the effectiveness of said sealing means.

Another Another important object is to minimize damaging shock to the valve upon closing thereof.

SUMMARY OF THE INVENTION

The spherical plug is supported by rings in a fluid chamber in the valve's housing, The support rings being vented from side to side to permit restricted fluid flow between opposite sides thereof. Fluid is substantially retained in said chamber between two slightly resilient sealing rings, separate from the support rings, and engaging the plug, at opposite sides thereof, in circular, narrow or substantially line contact to minimize friction. The upstream sealing rings are responsive to upstream fluid pressure to enhance their sealing effect.

THE DRAWING

DESCRIPTION OF THE DISCLOSED EMBODIMENT

Figure 1:
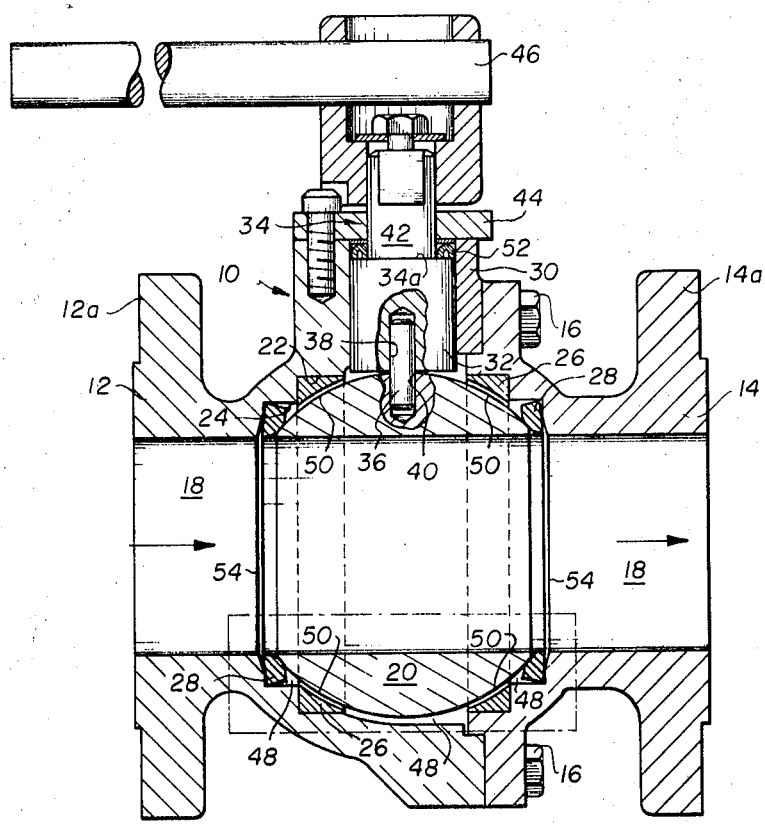
FIG. 1 is a central, axial, sectional view of an open ball valve according to a preferred embodiment of this invention.

FIG. 1 shows the valve as open. The valve comprises a housing 10, consisting, for convenience of assembly, of a valve body 12 and a tailpiece 14, suitably gasketed, and secured to one end of the valve body by machine screws 16. The valve body and tailpiece are provided with connection flanges 12a and 14a which may be suitably bolted to pipes and/or fluid containers, not shown.

The housing 10 is formed with a fluid passage 18 which is centrally enlarged to receive a generally spherical plug 20 and is formed with two, opposite, similar sets of channels, 22 and 24, adapted respectively to serve as seats for two similar support rings 26 and, separately, as seats for two similar sealing rings 28. With some advantage, the support rings 26 and the sealing rings 28 may be of polytetrafluoroethylene or other, somewhat similar, relatively hard, somewhat resilient material.

Above the plug 20, the valve body 12 is formed with a generally cylindrical neck 30, carrying therewithin an enlarged lower end portion 32 of a rotatable valve stem 34. Rotary movement of the latter is communicated to the plug 20 by a pair of driving pins 36 seated in eccentric bores 38 in the stem portion 32 and eccentric bores 40 in the upper part of the plug 20 (only one of these driving pin arrangements being shown).

A reduced upper end portion 42 of the valve stem projects upwardly through a retained plate 44 which is bolted to the upper end of the neck 30. A suitable handle 46, for operating the valve, is fixed to the outer end of the stem's reduced portion 42.

The area within the housing 10, surrounding the plug 20, and located between the two sealing rings 28, constitutes a fluid chamber 48 for aiding in the support and operation of said plug.

The support rings 26 have inner surfaces concavely shaped complementally to the adjacent surface areas of the plug 20, to support the latter in the valve body 12 and the tailpiece 14.

Although the support rings 26 are located in the chamber 48, the fluid in that chamber is not confined by said support rings as the latter are formed with plural, transverse, venting passages shown as grooves 50 which provide fluid communication between opposite sides of the support rings 26. Only two such venting grooves are shown on each of the support rings, but more of such grooves may be provided in such diameter and number as to yield desirable results as hereinafter explained.

Fluid is sealed against escape from the chamber 48, around the stem 34, by suitable packings 52, held tightly within the neck 30, and between the retainer plate 44 and a shoulder 34a of the valve stem.

The radial wall of the channel 24 in the tailpiece 14 (as well as in the valve body 12) is flared or cut back angularly to provide a wedge-shaped annular space 54 at the outer side of each sealing ring 28, coextensive with the radially inner half (approximately) of said sealing ring.

The sealing rings 28 in a completely assembled valve are stressed in slightly everted, or cocked, or twisted condition as shown in the drawing. Prior to the final tightening together of the several parts of the valve in the making thereof, the sealing rings are relaxed and initially seat accurately within the angles of the channels 24. Final tightening of the screws 16, however, causes the sealing ring 28 to become cocked, as illustrated, and mechanically pressured between its sealing surface 28b and an opposite point where it is firmly engaged at a circular juncture line 56 between the flat and the flaring surfaces of the radial wall of the channel 24.

Figure 2:
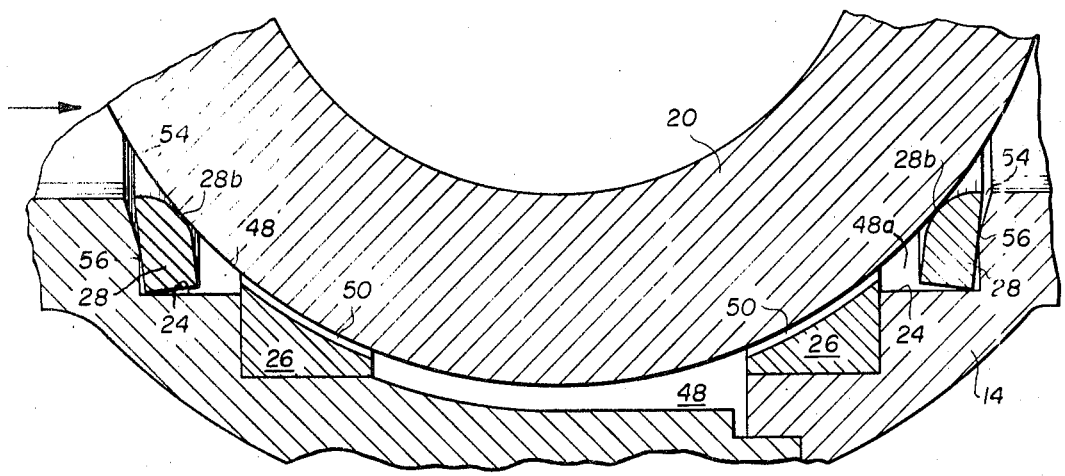
FIG. 2 is an enlargement of the chain-line-encompassed portion of FIG. 1, the parts therein, however, being as when the valve is closed.

When the valve is open, as in FIG. 1, fluid, which has seeped from the passage 18, past the sealing rings 28, fully occupies the chamber 28 is of little consequence. Largely because of the narrow-line interengagement between the sealing rings 28 and the plug 20, with consequent light friction, the plug may easily be turned, when desired, from open position to closed position as shown in FIG. 2.

The illustrated valve operates similarly, irrespective of the direction of fluid flow in relation thereto, as the rings 26, 28 are identical at opposite ends of the valve and in reversed positions. Assuming that the fluid flow through the valve, when open, has been from left to right, the closing of the valve causes the high fluid pressure in the upstream (left) side of passage 18 to become effective within the left wedge shaped space 54. Thus, the fluid pressure urges the radially inner annular portion of the left ring 28 toward the plug 20, whereby the fluid pressure enhances the sealing effect of said sealing ring.

As the support and sealing ring arrangements are identical at opposite sides of the valve, it should be clear that a valve as disclosed herein, will function similarly for valving fluid moving in either direction through the valve.

The valve may be opened without the use of excessive force because of the low friction characteristic of the polytetrafluoroethylene (or somewhat similar substance) of which the support rings 26 are made, and, also, because of the very narrow-line engagement of the sealing rings 28 with the plug 20.

The disclosed valve minimizes damage to its parts upon being closed, partly because of the at least slightly resilient compositions of the rings 26 and 28, and also, probably because of the effect of fluid which is more or less statically contained in the fluid chamber 48.

In the absence of a chamber such as chamber 48, and fluid therein, an ordinary closing operation of the valve would impose a sudden fluid pressure force upon the plug 20, causing the latter to, at least momentarily, press more firmly against and slightly deform the donwstream support rings 26 and sealing rings 28. Such a condition imposes a severe strain upon the valve and, upon repeated operation of the valve, may cause permanent deformation and damage to the support rings and sealing rings.

The fluid in the chamber 48, however, acts as shock absorbing means. Again assuming, for example, that fluid flow is rightward as viewed in the drawing, the fluid in portion 48a of said chamber opposes such momentary increase of the pressing of the plug 20 against the downstream support rings and sealing rings. That opposition is tempered, however, by the condition that fluid may pass, relatively slowly, through grooves 50 of the downstream support ring 26, from portion 48a of chamber 48 into the remainder of the latter chamber. This relatively slow fluid movement eases the plug 20 against the downstream supporting ring 26 and downstream sealing ring 28. Thus, shock and damage to the vale is substantially minimized.

I claim:

1. In a ball valve comprising a housing formed with a fluid passage extending therethrough; a generally spherical valving plug in an enlarged part of said passage, said plug being formed with a fluid passage extending therethrough; and means for turning said plug about an axis extending transversely of the housing's said passage between open and closed relationships of the plug's said passage and the housing's said passage; the combination comprising a pair of support rings, disposed in parallel planes extending transversely of the plug's said passage, seated toward opposite ends of said enlarged part, and having concave inner surface portions in sliding engagement with outer, convex surface portions of said plug toward but distal from opposite sides of the plug, said support rings each being formed with venting means providing fluid communication between opposite sides thereof; and a pair of slightly resilient sealing rings, seated separately within said housing and spaced from the support rings, in parallelism with the latter, one of the latter pair being at the upstream side of said plug and the other of the latter pair being at the downstream side of said plug, said sealing rings having annular, convex, inwardly facing sealing surfaces in narrow-line, slidable sealing engagement with adjacent convex surface portions of the plug, and said sealing rings having axially outer surfaces receptive to fluid pressure for axially urging portions of said sealing rings toward said plug, to enhance the rings' s sealing engagement therewith.

2. The combination according to claim 1, said sealing rings, said housing, and said plug defining a fluid chamber, said support rings subdividing said fluid chamber into plural portions, and said venting means comprising grooves serving to control the movement of fluid between said plural portions of the fluid chamber.

3. The combination according to claim 1, each of said sealing rings being seated in an interior, annular right angular channel formed in said housing, said channel having an outer cylindrical wall and a radially inwardly extending wall having a flat, annular portion right angularly adjoining said cylindrical wall and an outwardly flared, annular portion angularly adjoining said flat portion; each of said sealing rings, in relaxed condition, having a cylindrical outer peripheral surface and a flat outer side surface, adjoining said cylindrical surface approximately at a right angle; said sealing rings being in a stressed, cocked condition in the valve with its said flat outer surface engaging the circular juncture between said flat and flared portions of the channel's s said radially extending wall and substantially clear of engagement with said flat and flared portions, and a portion of the outer side of the sealing ring's said flat outer surface defining, with said flared portion, a fluid pressure area in which fluid therein is effective upon the sealing ring to urge the latter firmly into sealing engagement with said plug.

4. In a ball valve comprising a housing formed with a fluid passage extending therethrough; a generally spherical valving plug in an enlarged part of said passage, said plug being formed with a fluid passage extending therethrough; and means for turning said plug about an axis extending transversely of the housing's said passage between open and closed relationships of the plug's said passage and the housing's said passage; the combination comprising a pair of support rings, disposed in parallel planes extending transversely of the plug's said passage, seated toward opposite ends of said enlarged part, and having concave inner surface portions in sliding engagement with outer, convex surface portions of said plug toward but distal from opposite sides of the plug, and a pair of slightly resilient sealing rings, seated separately within said housing and spaced from the support rings, in parallelism with the latter, one of the latter pair being at the upstream side of said plug and the other of the latter pair being at the downstream side of said plug, said sealing rings having annular sealing surfaces in slidable sealing engagement with adjacent annular surface portions of the plug, said sealing rings each having a surface receptive to fluid pressure for axially urging and maintaining a portion of the sealing ring in sealing relation to said plug.

5. The combination according to claim 4, said sealing rings, said housing, nd said plug defining a fluid chamber, said support rings subdividing said fluid chamber into plural portions, and having venting grooves serving to control the movement of fluid between said plural portions of the fluid chamber.

6. The combination according to claim 4, each of said sealing rings and seated in cocked condition in an interior, annular right angular channel formed in said housing, said channel having an outer cylindrical wall and a radially inwardly extending wall having a flat, annular portion right angularly adjoining said cylindrical wall and an outwardly flared, annular portion angularly adjoining said flat portion; the sealing ring having an axially outwardly facing surface, in acute angular relation to said flared portion, and receptive of fluid pressure for enhancing the sealing engagement of the sealing ring with said plug.

7. The combination according to claim 4, said support rings and sealing rings at opposite sides of said plug being substantially similar and facing oppositely, whereby to render the valve duodirectional.

8. In a ball valve comprising a housing formed with a fluid passage extending therethrough; a generally spherical valving plug in an enlarged part of said passage, said plug being formed with a fluid passage extending therethrough; and means for turning said plug about an axis extending transversely of the housing's said passage between open an closed relationships of the plug's said passage and the housing's said passage; the combination comprising a pair of support rings, disposed in parallel planes extending transversely of the plug's said passage, seated toward opposite ends of said enlarged part, and having concave inner surface portions in sliding engagement with outer, convex surface portions of said plug toward but distal from opposite sides of the plug, said support rings each being formed with venting means providing fluid communication between opposite sides thereof; and sealing means within said housing and spaced from said support rings, said sealing means being in sealing engagement with both said housing and said plug.